(12) United States Patent
Herfurth et al.

(10) Patent No.: US 9,793,796 B2
(45) Date of Patent: Oct. 17, 2017

(54) DRIVER CONTROLLER WITH AC-ADAPTED AND DC-ADAPTED CONTROL MODES

(71) Applicant: Infineon Technologies Austria AG, Villach (AT)

(72) Inventors: Michael Herfurth, Gilching (DE); Xiaowu Gong, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 382 days.

(21) Appl. No.: 14/628,841

(22) Filed: Feb. 23, 2015

(65) Prior Publication Data
US 2016/0248264 A1   Aug. 25, 2016

(51) Int. Cl.
*H02M 3/156* (2006.01)
*H02M 1/10* (2006.01)
*H02M 1/42* (2007.01)

(52) U.S. Cl.
CPC ............ *H02M 3/156* (2013.01); *H02M 1/10* (2013.01); *H02M 2001/4291* (2013.01); *Y02B 70/126* (2013.01)

(58) Field of Classification Search
CPC .................................................... H02M 3/156
See application file for complete search history.

(56) References Cited

U.S. PATENT DOCUMENTS

2011/0085813 A1* 4/2011 Na .................. G03G 15/5004
399/69

OTHER PUBLICATIONS

"Non-isolated Buck APFC Offline LED Controller," Bright Power Semiconductor Co., Data Sheet BP2329A, Rev. 1.1, retrieved from http://www.bpsemi.coni/pdf/BP2329A/BP2329A_EN_DS_Rev_1.1.pdf on Feb. 23, 2015, 8 pp.
"Non-isolated Buck Offline LED Driver," Bright Power Semiconductor Co., Data Sheet BP2832A, Rev. 1.0, retrieved from http://www.bpsemi.com/pdf/BP2832A/BP2832A_EN_DS_Rev.1.0.pdf on Feb. 23, 2015, 8 pages.

* cited by examiner

*Primary Examiner* — Daniel Puentes
(74) *Attorney, Agent, or Firm* — Shumaker & Sieffert, P.A.

(57) ABSTRACT

Methods, devices, and integrated circuits are disclosed for a driver controller that determines whether an input is AC or DC and controls a driver in either an AC-adapted control mode or a DC-adapted control mode. An example method includes detecting whether an input is primarily AC or DC. The method further includes controlling an output current in an AC-adapted control mode in response to detecting that the input is primarily AC, and controlling the output current in a DC-adapted control mode in response to detecting that the input is primarily DC.

17 Claims, 5 Drawing Sheets

DRIVER CONTROLLER WITH AC-ADAPTED AND DC-ADAPTED CONTROL MODES

TECHNICAL FIELD

This disclosure relates to electronic circuits, and in particular, to current drivers.

BACKGROUND

Some driver circuit applications are designed to provide a driving current, such as for groups of light-emitting diodes (LEDs). The number of LEDs may vary depending on the specific application. A driver may control the current flowing through the LED chain, while the output voltage may be set by the number and the forward voltage of the LEDs that compose the chain. In many applications, it is desirable for the driver to deliver a constant average current (as opposed to, e.g., a constant voltage) through the load when the load is switched on. The driver may be incorporated in a larger system that may have mixed or ambiguous power requirements, particularly when the system is designed in typical engineering compromise among competing design constraints including low cost, fast response, and small sized components. For example, some systems provide power to a driver converted from AC to DC, although competing design constraints sometimes dictate that this conversion is done imperfectly, such as using a rectifier and a relatively undersized smoothing capacitor.

SUMMARY

In general, various examples of this disclosure are directed to a driver controller that includes an input type detector and a conditional two-mode control. Typically, a driver designed for AC input that receives a primarily DC input may exhibit substantial performance drawbacks such as very slow initial delivery of output current to the load, and substantial ripple current in the output; while a driver designed for DC input that receives a primarily AC input may fail ever to reach a minimum threshold voltage over each AC half-cycle, and may therefore completely fail to provide any output current. In a driver controller of this disclosure, the input type detector distinguishes between AC input and DC input in a voltage source that may be mixed or ambiguous, or having ambiguous requirements. The conditional two-mode control controls the driver to output current in an AC-adapted control mode when the input current is primarily AC, and in a DC-adapted control mode when the input current is primarily DC. The AC-adapted control mode may enable efficient operation (e.g., with power factor adapted to AC input, fast initial delivery of output current, low ripple current in output) when the input is primarily AC, and the DC-adapted control mode may enable high-performance operation (e.g., with a fast control loop) when the input is primarily DC. The driver controller may thus be "AC-adapted" or "DC-adapted" in that it may be operated in a control mode adapted to either primarily AC input or primarily DC input, and efficiently deliver a constant current output in the case of either type of input.

In a particular example, when the input is primarily AC, a driver controller of this disclosure may control the driver to output current in a constant AC turn-on time; and when the input is primarily DC, the driver controller may control the driver to output current in a peak current control mode. When operating in constant AC turn-on time mode, the driver controller may measure the AC half-cycle time and determine the average current and the constant AC turn-on time. A driver controller of this disclosure may thus control an output current in an efficient manner across a wide variety of input types.

Some examples are directed to a method of controlling a driver. An example method includes detecting whether an input is primarily alternating current (AC) or primarily direct current (DC). The method further includes controlling an output current in an AC-adapted control mode in response to detecting that the input is primarily AC, and controlling the output current in a DC-adapted control mode in response to detecting that the input is primarily DC.

Some additional examples are directed to a driver controller device. An example driver controller device includes an input type detector; and a conditional two-mode output control.

Some additional examples are directed to an integrated circuit for controlling a driver. An example integrated circuit includes an input type detector; and a conditional two-mode output control.

The details of one or more examples of this disclosure are set forth in the accompanying drawings and the description below. Other features, objects, and advantages will be apparent from the description and drawings, and from the claims.

DETAILED DESCRIPTION

Figure 1:
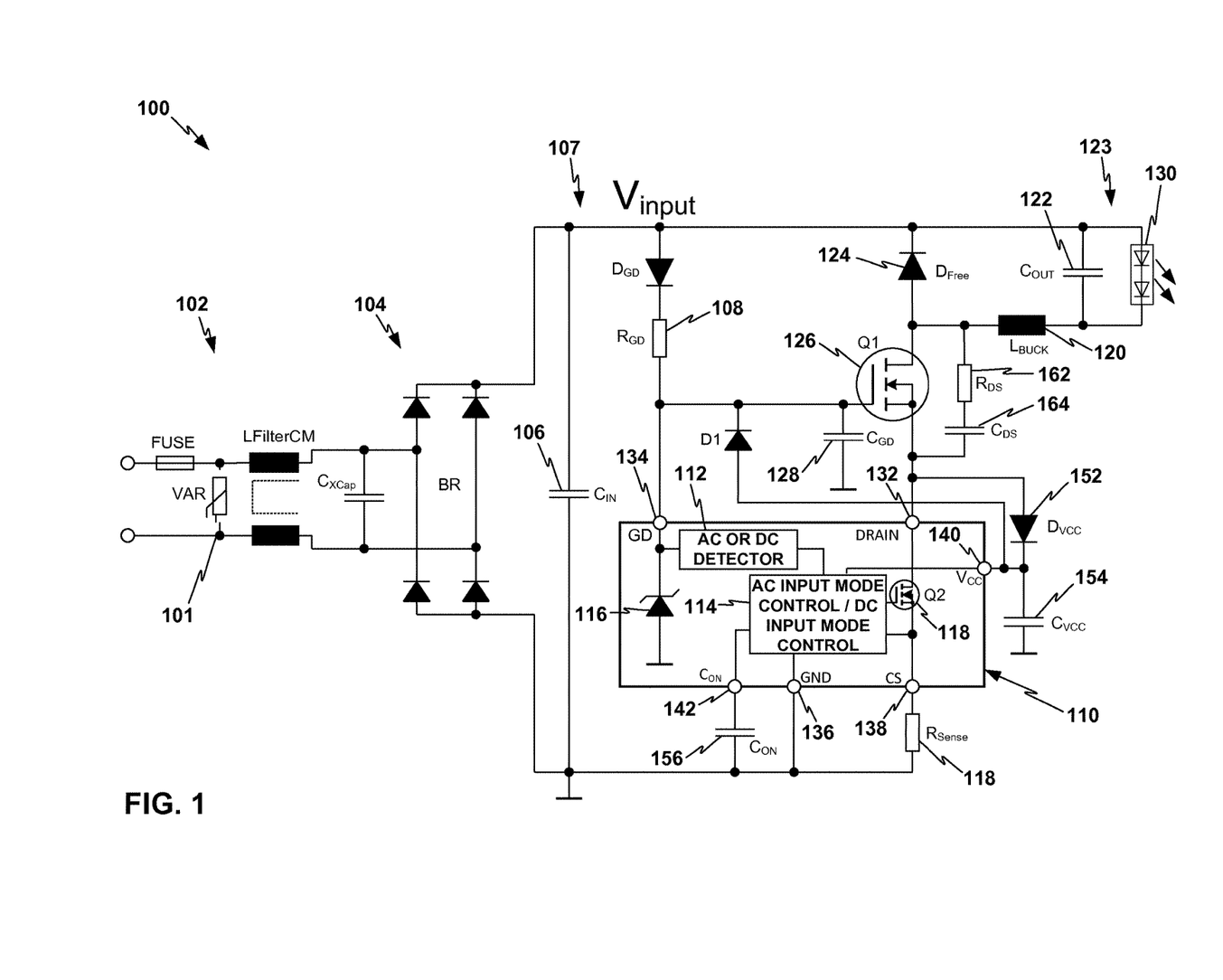
FIG. 1 is a block circuit diagram illustrating a driver with driver controller that includes an input type detector and a conditional two-mode control, in accordance with an example of this disclosure.

FIG. 1 is a block circuit diagram illustrating a driver 100 with a driver controller 110 that includes an input type detector 112 and a conditional two-mode output control 114, in accordance with an example of this disclosure. Driver controller 110 is configured to detect whether the input is AC or DC, and to operate the driver in an AC-adapted control mode or a DC-adapted control mode conditionally on which input type is detected. Aspects of a driver configured to detect the input type and implement output control advantageous for the detected input type are further described with reference to various examples below.

Driver 100 (e.g., a current driver) includes driver controller 110. Driver 100 also includes AC filter 102, rectifier 104, input smoothing capacitor ($C_{IN}$) 106, gate driver (GD) resistor ($R_{GA}$) 108, external high side metal-oxide-semiconductor field-effect transistor (MOSFET) transistor power switch ($Q_1$) 126 ("external high side power switch 126"), gate driver capacitor ($C_{GS}$) 128, supply voltage diode ($D_{VCC}$) 152, supply voltage capacitor ($C_{VCC}$) 154, source-drain (SD) resistor 162, SD capacitor 164, current sense resistor (Rcs) 118, current buffer buck inductor $L_0$ 120, output smoothing capacitor $C_{out}$ 122, and output filtering diode ($D_1$) 124. Driver 100 is connected via an input connection 107 to a potentially variable AC voltage supply 101. Driver 100 has a load 130, an array of LEDs in this example, attached to its output connection 123 as a load enabled to receive the output current of driver 100. Driver 100 thus receives an input (e.g., a voltage input) via its input connection 107 that may be primarily AC, primarily DC, or an ambiguous mix of AC or DC, due to factors such as the size and capacitance of smoothing capacitor 106 and/or other conversion hardware in other examples. Driver 100 may be configured to deliver a constant current output to load 130. Driver 100 may have certain design requirements for delivering an output current via output connection 123 to its load 130.

As shown in the example of FIG. 1, driver controller 110 also has a drain pin 132, connected to external high side power switch 126; a gate driver (GD) pin 134 connected to GD resistor 108; a ground pin 136 connected to ground; an output (CS) pin 138 connected to current sense resistor 118; a supply voltage $V_{CC}$ pin 140 connected to supply voltage diode 152 and supply voltage capacitor 154; on-time measurement capacitor ($C_{ON}$) pin 142 connected to on-time measurement capacitor ($C_{ON}$) 156; internal GD voltage clamp 116; and an internal low side MOSFET transistor power switch (Q2) 118 connected to drain pin 132, conditional two-mode output control 114, and output pin 138. When driver 100 is turned on, via external high side power switch 126, current flows through driver controller 110 and external high side power switch 126 to load 130 during the turn-on period of internal low side power switch 118. Internal low side power switch 118 switches on and off in a timed alternating pattern to maintain the output at a specified current. Internal low side power switch 118 of driver controller 110 may alternate between turn-on and turn-off intervals with a high frequency, such as 60 kilohertz, or any other value that meets design specifications for a given implementation. Internal GD voltage clamp 116 may clamp the high side voltage at a stable level at external high side power switch 126.

Input type detector 112 of driver controller 110 may receive the input (e.g., the input current) via GD pin 134 and detect whether the input is primarily AC or primarily DC. Input type detector 112 may then communicate the detected input type to conditional two-mode output control 114 of driver controller 110. Conditional two-mode output control 114 may control the output current of driver 100 in an AC-adapted control mode in response to receiving an indication from input type detector 112 of detecting that the input current is primarily AC, and conditional two-mode output control 114 may control the output current of driver 100 in a DC-adapted control mode in response to receiving an indication from input type detector 112 of detecting that the input current is primarily DC. Additional details of driver controller 110 are shown in FIG. 2.

Figure 2:
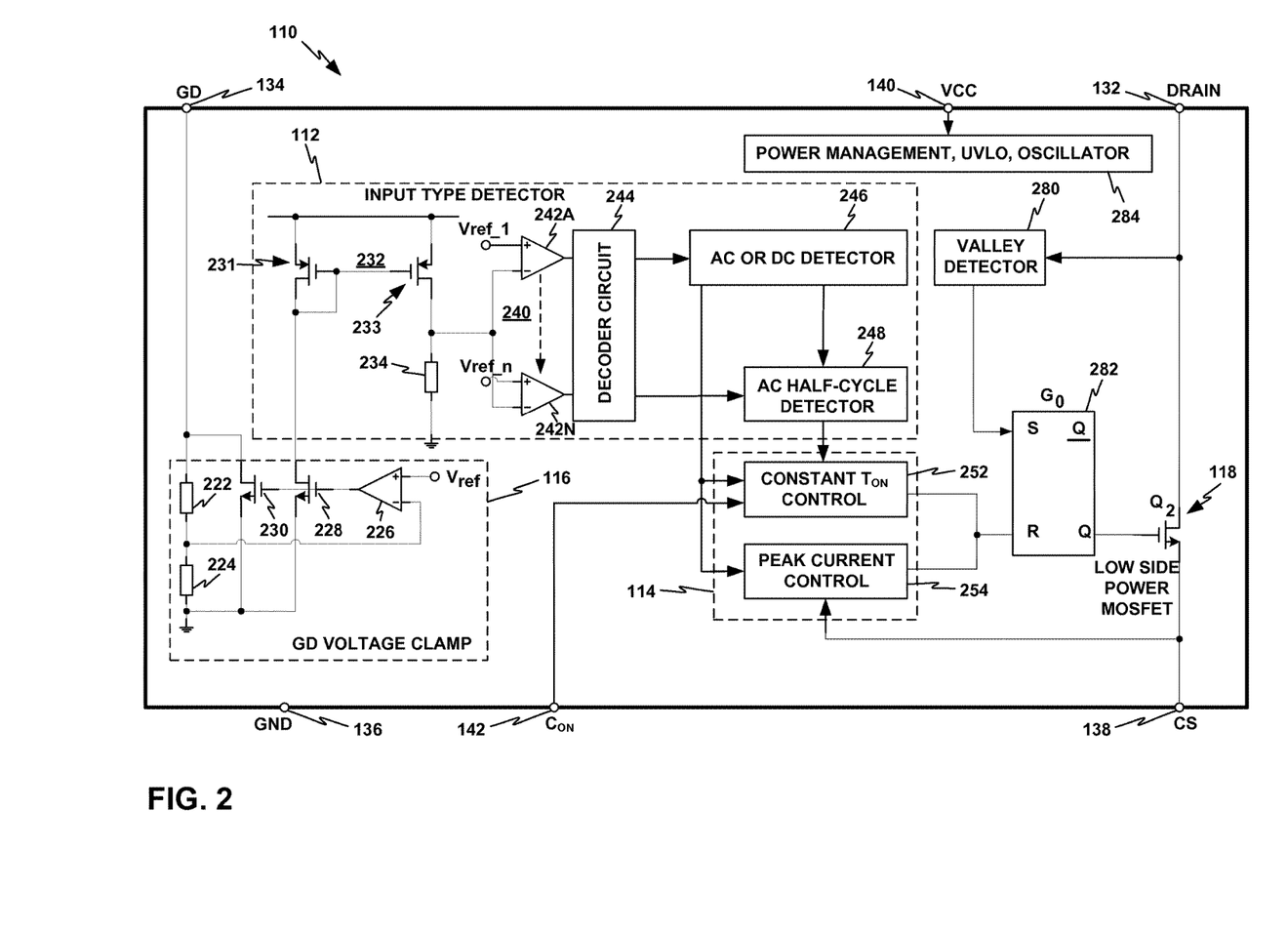
FIG. 2 is a block circuit diagram illustrating in additional detail a driver controller that includes an input type detector and a conditional two-mode control, in accordance with an example of this disclosure.

FIG. 2 is a block circuit diagram illustrating in additional detail a driver controller 110 that includes an input type detector 112 and a conditional two-mode output control 114, in accordance with an example of this disclosure. Driver controller 110 as in FIG. 2 may be a particular example of driver controller 110 as in example driver 100 of FIG. 1. Driver controller 110 of FIG. 2 is configured to detect whether the input is AC or DC and then operate driver 100 in either an AC-adapted control mode or a DC-adapted control mode accordingly.

Driver controller 110 includes GD pin 134, ground pin 136, $C_{ON}$ pin 142, output (CS) pin 138, drain pin 132, supply voltage ($V_{CC}$) pin 140, and internal power switch 118 connected between drain pin 132 and output pin 138, as also shown in FIG. 1. Driver controller 110 also includes various other internal components, including GD voltage clamp 116; valley detector 280; latch 282; and power management/undervoltage-lockout (UVLO)/oscillator 284. Input type detector 112 receives the input through voltage clamp 116 and communicates an indication of the input type it detects to conditional two-mode output control 114. Conditional two-mode output control 114 also has another input from CON capacitor 156 via CON pin 142. Valley detector 280 and conditional two-mode output control 114 have outputs connected to the set and reset pins, respectively, of latch 282, which outputs to low side power switch 118. In some examples, depending on implementation or design requirements, various components such as voltage clamp 116 or valley detector 280 may be omitted. These components of driver controller 110 are described in additional detail as follows.

GD pin 134 is connected to the system input voltage through GD resistor 108, as shown in FIG. 1. GD pin 134 is connected to ground through GD voltage clamp 116. GD voltage clamp 116 includes two resistors 222 and 224 connected between GD pin 134 and ground, between which is a node connected to the inverting input of an operational amplifier (op-amp) 226, which has a reference voltage $V_{ref0}$ connected to its non-inverting input. The output of op-amp 226 is connected to the gate of an n-type metal-oxide-semiconductor (NMOS) transistor 228, and the source of NMOS transistor 228 is connected to ground. A back gate of NMOS transistor 228 is connected to the gate of another NMOS transistor 230, which has its source and drain connected between GD pin 134 and ground. Op-amp 226, reference voltage $V_{ref0}$, and NMOS transistor 230 may clamp the voltage $V_{GD}$ through GD pin 134, which connects to the gate of external high side power switch 126, at a stable value. This stable voltage $V_{GD}$ may maintain sufficient voltage for external high side power switch 126 when internal low side power switch 118 is turned on. The drain line of NMOS transistor 228 is connected to an input line of input type detector 112. In this way, input type detector 112 may receive the high side voltage of controller 100 via voltage clamp 116.

Input type detector 112 receives the high side voltage of controller 100 via a current mirror 232. Current mirror 232 includes two p-type metal-oxide-semiconductor (PMOS) transistors 231 and 233. PMOS transistors 231 and 233 may provide input voltage reflection. The output of current mirror 232 is connected to comparator chain 240, and through resistor 234 to ground. NMOS transistor 228, PMOS transistors 231 and 233, and resistor 234 combined together as shown in FIG. 2 may convert the system input voltage signal of driver 100 into an inside chip voltage signal adapted for within the downstream components of driver controller 110.

Comparator chain 240 includes a chain of comparators 242A-242N, each of which has an input connected to current mirror 232 and another input connected to a respective reference voltage 1-N, $V_{ref1}$-$V_{refN}$. The various reference voltages feeding into the comparators 242A-242N of comparator chain 240 may each be different and may be ordered at regular intervals in a sequence of voltage levels, which may cover a range of nominal AC or DC input voltage levels that driver 100 may be anticipated to receive in a typical variety of use cases. The comparators 242A-242N may output to decoder circuit 244, which outputs to AC or DC detector circuit 246. Input type detector 112 in the example implementation of FIG. 2 is thus configured to compare the high side voltage of driver 100 to all of the spaced-apart reference voltages of comparator chain 240 over time, and detect the behavior and voltage over time of the input, including whether the input is primarily AC or primarily DC. In other examples, input type detector 112 may be implemented with various other means for detecting whether the input is primarily AC or primarily DC, such as by including a processing unit programmed with executable firmware or software instructions for analyzing the behavior of the input.

Decoder circuit 244 and AC or DC detector 246 may also output to AC half-cycle detector 248, which may calculate and determine the time period of one half-cycle of an AC input when the input is AC. When the input is AC, driver controller 110 may use the determined AC half-cycle period to calibrate the AC output of controller 100 with an efficient turn-on time ($T_{on}$ time) relative to the AC period or frequency of the input.

Two-mode output control 114 includes both an AC-adapted output control and a DC-adapted output control. In the example of FIG. 2, the AC-adapted output control is implemented as a constant turn-on time ($T_{on}$ time) control 252, and the DC-adapted output control is implemented as a peak current control 254. Constant $T_{on}$ time control 252 may be implemented with a pulse width modulator (PWM) in some examples.

Peak current control 254 may be implemented with a low power factor. Peak current control 254 is configured with an input from the output of low side power switch 118 through output (CS) pin 138. Peak current control 254 may be implemented with a fixed peak voltage to switch low side power switch 118 off again each time the output voltage from low side power switch 118 through output (CS) pin 138 reaches the fixed peak voltage, and to switch low side power switch 118 on again each time the output voltage from low side power switch 118 through output (CS) pin 138 reaches zero again.

Input type detector 112 has outputs connected to conditional two-mode output control 114. In particular, AC or DC detector 246 has an output connected to both constant $T_{on}$ time control 252 and peak current control 254. Constant $T_{on}$ time control 252 also has inputs connected from AC half-cycle detector 248 and on-time measurement capacitor ($C_{ON}$) 156 (as shown in FIG. 1) via $C_{ON}$ pin 142. Driver controller 110 may use $C_{ON}$ capacitor 156 to measure average DC output current to feed into constant $T_{on}$ time control 252, so that in AC-adapted control mode, constant $T_{on}$ time control 252 may control the average output current to be constant at the target value of average output current based on its measurement from $C_{ON}$ capacitor 156. Conditional two-mode output control 114 may thus be configured to control the output current in an AC-adapted control mode, with constant $T_{on}$ time control 252 generating the outputs of conditional two-mode output control 114, in response to input type detector 112 detecting that the input current is primarily AC.

Conditional two-mode output control 114 may thus be further configured to control the output current in a DC-adapted control mode, with peak current control 254 generating the outputs of conditional two-mode output control 114, in response to input type detector 112 detecting that the input current is primarily DC. The AC-adapted control mode may enable efficient operation (e.g., with power factor adapted to AC input, fast initial delivery of output current, low ripple current in output) when the input is primarily AC, and the DC-adapted control mode may enable high-performance operation (e.g., with a fast control loop) when the input is primarily DC. The AC-adapted control mode may enable efficient operation (e.g., with power factor adapted to AC input, fast initial delivery of output current, low ripple current in output) when the input is primarily AC, and the DC-adapted control mode may enable high-performance operation (e.g., with a fast control loop) when the input is primarily DC.

Figure 3:
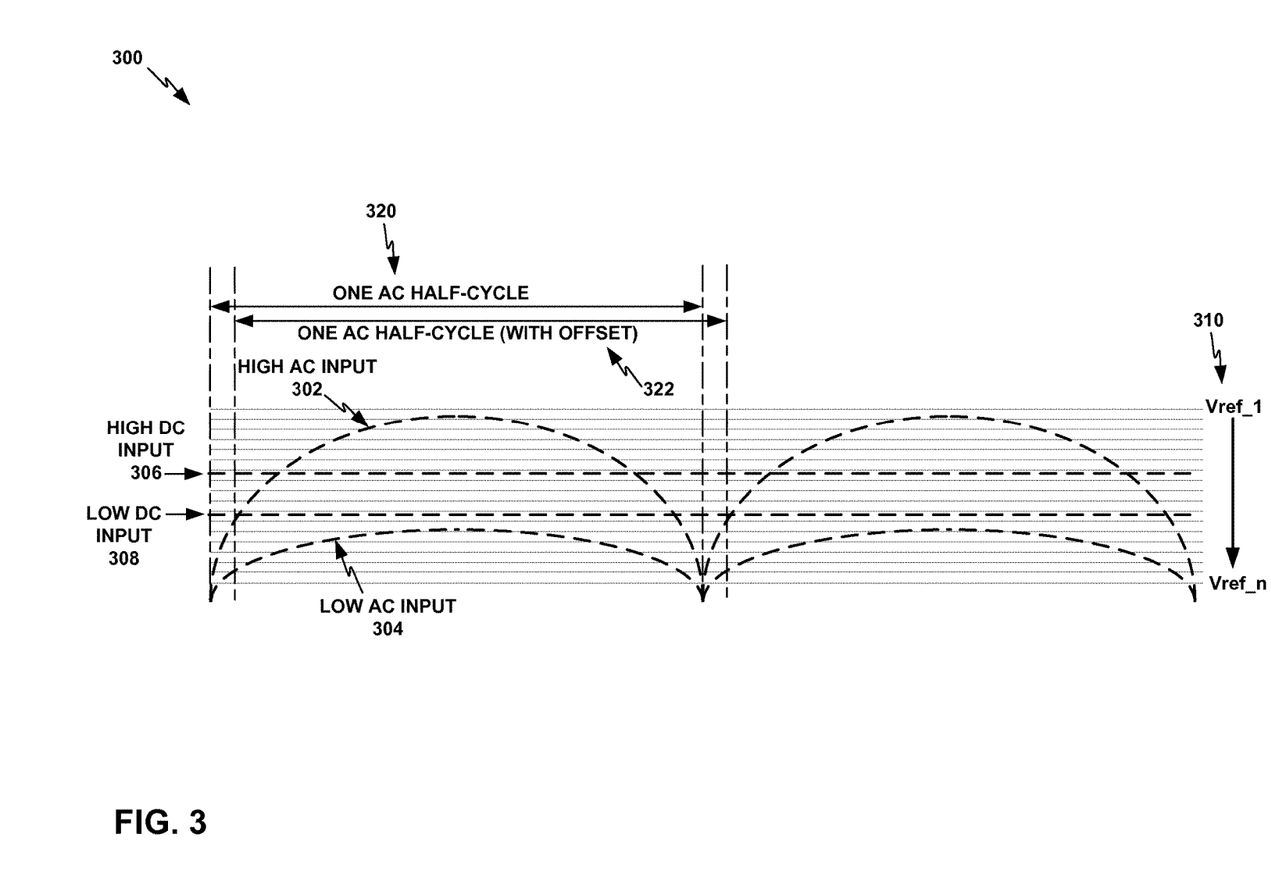
FIG. 3 shows an input graph of voltage over time with various AC and DC inputs as they may be detected by an input type detector of a driver controller, in accordance with an example of this disclosure.

FIG. 3 shows an input graph 300 of voltage over time with various AC and DC inputs as they may be detected by input type detector 112 of driver controller 110, in accordance with an example of this disclosure. A range 310 of reference voltages $V_{ref1}$-$V_{refN}$ at regular voltage intervals are shown in horizontal dotted lines across graph 300, each of which may be connected to an input of a respective one of comparators 242A-242N in comparator chain 240 of FIG. 2. Graph 300 thus shows how input type detector 112 of driver controller 110 may detect the voltage of the input to driver controller 110, and whether and how the voltage changes over time, e.g., whether the input is AC or DC, or primarily AC or DC. Graph 300 shows example inputs including high AC input 302, low AC input 304, high DC input 306, and low DC input 308. As graph 300 shows, the more comparators 242A-242N are comprised in comparator chain 240, each with their own reference voltage, the higher resolution input type detector 112 will be capable of in determining the voltage of a DC input (e.g., DC inputs 306 and 308) and in determining AC characteristics such as maximum voltage and half-cycle period of an AC input (e.g., AC inputs 302 and 304).

Input type detector 112 thus uses comparator chain 240 to compare the input voltage to internal reference voltages, and may transmit the outputs of all of comparators 242A-242N in comparator chain 240 to decoder circuit 244 and AC or DC detector 246 to determine if the input is primarily AC or primarily DC. Decoder circuit 244 and AC or DC detector 246 also output to AC half-cycle detector 248 so that if the input is primarily AC, AC half-cycle detector 248 determines the period of one AC half cycle of the input.

In cases where the input is primarily AC, AC half-cycle detector 248 may signal to constant $T_{on}$ time control 252 of conditional two-mode output control 114 the beginning of an AC half-cycle to coincide with the input being at its minimum. This is shown in FIG. 3 as one AC half-cycle 320 as signaled from AC half-cycle detector 248 to constant $T_{on}$ time control 252 to coincide with a half-cycle of an AC input such as depicted AC inputs 302, 304. Constant $T_{on}$ time control 252 may then use the timing of the AC half-cycle in controlling driver 100 in the AC-adapted control mode. Constant $T_{on}$ time control 252 may be tolerant to imprecision in the timing of the beginning of each AC half-cycle, such that AC half-cycle detector 248 may signal the AC half-cycle with a timing offset, shown at 322, without significantly affecting the efficiency of operation of constant $T_{on}$ time control 252 in controlling driver 100.

Figure 4:
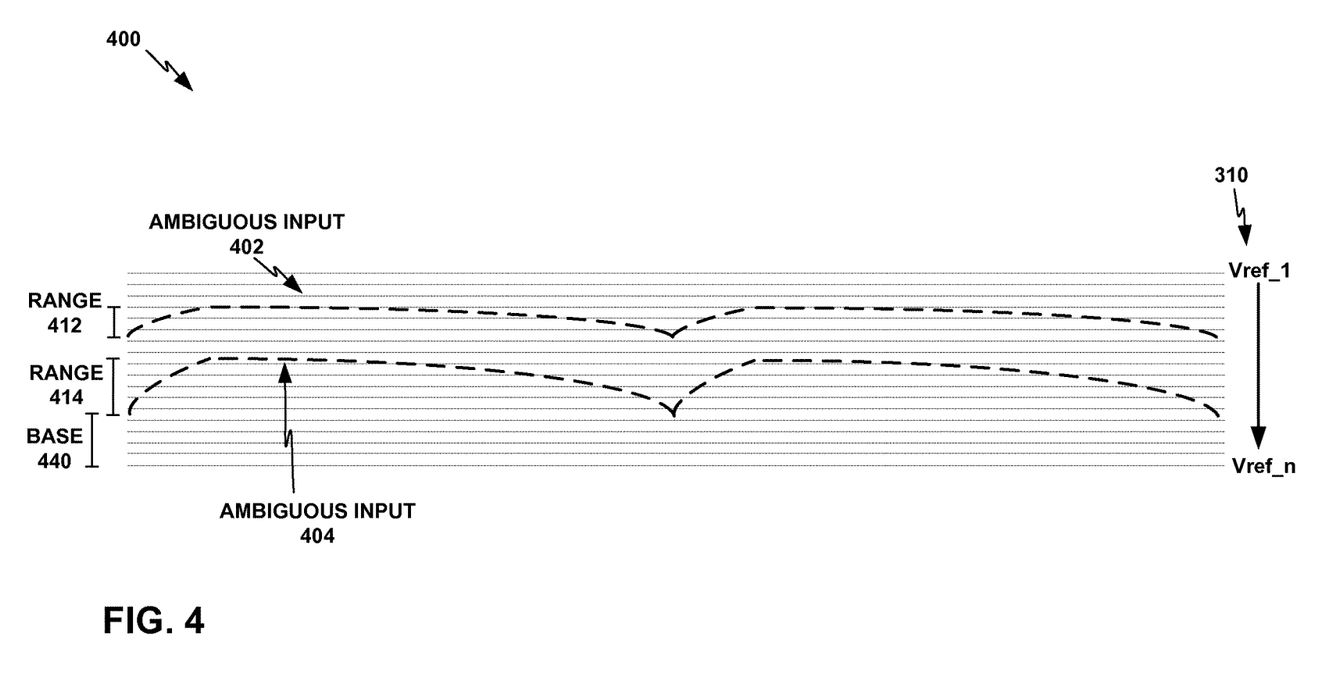
FIG. 4 shows an input graph of voltage over time with various ambiguous inputs as they may be evaluated and determined to be primarily AC or primarily DC by an input type detector of a driver controller, in accordance with an example of this disclosure.

FIG. 4 shows an input graph 400 of voltage over time with various ambiguous inputs 402 and 404 as they may be evaluated and determined to be primarily AC or primarily DC by input type detector 112 of driver controller 110, in accordance with an example of this disclosure. FIG. 4 also shows range 310 of reference voltages $V_{ref1}$-$V_{refN}$ at regular voltage intervals in horizontal dotted lines across graph 400, each of which may be connected to an input of a respective one of comparators 242A-242N in comparator chain 240 of FIG. 2. Graph 400 thus shows how input type detector 112 of driver controller 110 may detect the voltage over time of ambiguous inputs (e.g., 402, 404) to driver controller 110, and evaluate the ambiguous inputs to determine whether to classify or indicate an input as primarily AC or primarily DC, before input type detector 112 communicates that indication of primarily AC or primarily DC to conditional two-mode output control 114.

Input type detector 112 may detect a relatively ambiguous input 402 or 404 that has mixed AC and DC, such as may be received from an originally AC source that has been rectified and imperfectly smoothed with a relatively small smoothing capacitor, which may be demanded by certain design trade-offs. Input type detector 112 may implement a technique for determining whether such a relatively ambiguous input is primarily AC or primarily DC. For example, input type detector 112 may measure the total range of voltage variation between the minimum and maximum voltage of an ambiguous input (e.g., range 412 of input 402, range 414 or input 404), and determine the input to be primarily DC if the total range is less than a selected threshold, or primarily AC if the total range is greater than the selected threshold.

In the example of ambiguous input 402, input type detector 112 may detect that range 412 of input 402 is less than the selected threshold, and indicate ambiguous input 402 to be a primarily DC input. In the example of ambiguous input 404, input type detector 112 may detect that range 414 of input 404 is greater than the selected threshold, and indicate ambiguous input 404 to be a primarily AC input. In cases where the input is nominally and unambiguously AC or DC, input type detector 112 may thus also easily determine that the input is primarily AC (including nominally and unambiguously AC) or primarily DC (including nominally and unambiguously DC), respectively. Thus, detecting whether the input is primarily AC or primarily DC may include determining whether the minimum voltage of the input is less than the selected base threshold; determining the input to be primarily AC if the minimum voltage of the input is less than the selected base threshold; and determining the input to be primarily DC if the minimum voltage of the input is greater than (or not less than) the selected base threshold.

In some examples, input type detector 112 may also distinguish between periodically alternating differences in voltage and irregular or random differences in voltage, disregard the irregular or random differences in voltage, and only compare the periodically alternating differences in voltage to the selected range threshold. In these examples, detecting whether the input is primarily AC or primarily DC may include distinguishing between periodic variations (e.g., alternating, oscillating, or sine wave component) and non-periodic (e.g., random, noisy, irregular) variations in a voltage of the input; and evaluating the periodic variations but not the non-periodic variations in the voltage of the input in detecting whether the input is primarily AC or primarily DC.

In some examples, input type detector 112 may apply other criteria, such as a base minimum voltage (e.g., base 40 shown as a selected base minimum threshold above zero volts in graph 400). If the minimum voltage in an ambiguous input never drops below a selected base threshold, input type detector 112 may determine the input to be primarily DC, and if the minimum voltage does drop below the selected base threshold, input type detector 112 may determine the input to be primarily AC. As shown in the examples of graph 400, in these examples, input type detector 112 may determine that ambiguous input 402 never drops below base 440 and should be indicated as a primarily DC input, while input type detector 112 may determine that ambiguous input 404 does drop below base 440 and should be indicated as a primarily AC input.

In still other examples, input type detector 112 may combine these and/or other criteria, such as by assigning a selected weight to a total voltage range criterion, and a selected weight to a minimum voltage base threshold criterion. As a particular example of input type detector 112 applying combined criteria, input type detector 112 may determine a difference between a total voltage range of the input and a minimum value of the input, and if this difference is greater than a selected threshold, input type detector 112 may determine the input to be primarily AC, while if the difference is less than the selected threshold, input type detector 112 may determine the input to be primarily DC.

For example, detecting whether the input is primarily AC or primarily DC may include both measuring the total range of voltage variation between a minimum voltage and a maximum voltage of the input, and determining whether a minimum voltage of an input is less than a selected base threshold. Input type detector 112 may determine the input to be primarily AC if a weighted combination of the total range of voltage variation of the input relative to a selected range threshold and the minimum voltage of the input relative to the selected base threshold is greater than a selected weighted combination threshold. On the other hand, input type detector 112 may determine the input to be primarily DC if the weighted combination of the total range of voltage variation of the input relative to the selected range threshold and the minimum voltage of the input relative to the selected base threshold is less than (or not greater than) the selected weighted combination threshold.

In another example of input type detector 112 applying combined criteria, input type detector 112 may first determine if the minimum voltage of the input falls below a selected base minimum voltage threshold, and if so, determine the input to be primarily AC; and second, only if the minimum voltage of the input does not fall below the selected base minimum voltage threshold, determine whether the range of the input (or the periodic range of the input, after disregarding noise or irregular variation) is above or below a selected range threshold, and then determine the input to be primarily AC or primarily DC, respectively. Thus, in some cases in which the input varies over a significant range but the minimum voltage also remains well above zero, input type detector 112 may determine the input to be primarily DC, while if the input exhibited the same range translated lower in voltage such that the minimum was closer to zero, input type detector 112 would determine the input to be primarily AC.

In any of the above examples, input type detector 112 may make an initial determination that an input is primarily AC or primarily DC, and subsequently detect changed behavior in the input such that the input meets the criteria for the other input type. In some implementations of any of the above examples, input type detector 112 may continue monitoring the input and re-classify the input from primarily AC to primarily DC or vice versa if the conditions of the input have thus changed. Thus, detecting whether the input is primarily AC or primarily DC may include input type detector 112 making an initial determination that the input is primarily AC or primarily DC, subsequently detecting changed behavior of the input, and making a new determination of whether the input is primarily AC or primarily DC based on the changed behavior of the input. Any of the examples discussed herein may be selected to be particularly well-suited to specific design requirements of a particular implementation.

Thus, driver controller 110 may detect whether the input is AC or DC, and control driver 100 to drive a load efficiently across any of a wide range of inputs. This may include whether the input is AC or DC or an ambiguous combination of the two, and whether the voltage of the input is high or low. By differentiating between primarily AC inputs and primarily DC inputs, driver controller 110 may automatically shift between using constant $T_{on}$ control for AC input and peak current control for DC input. Driver controller 110 thus flexibly provides the advantages of both AC-adapted and DC-adapted control modes.

Figure 5:
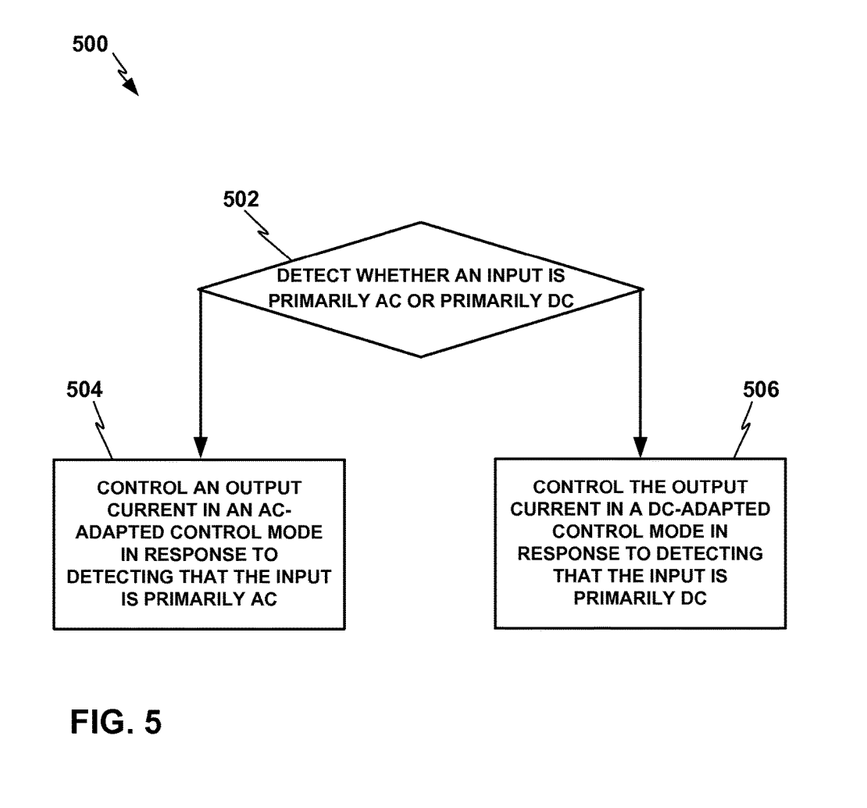
FIG. 5 is a flowchart illustrating a method of operating a driver with an input type detector and a conditional two-mode control, in accordance with an example of this disclosure.

FIG. 5 is a flowchart illustrating a method 500 of operating a driver in either an AC-adapted control mode or a DC-adapted control mode corresponding to the input type, among other advantages, in accordance with an example of this disclosure. Method 500 may be a more generalized form of the operation of various drivers with a driver controller of this disclosure that determines whether the input is primarily AC or primarily DC and then correspondingly uses or activates either an AC-adapted control mode or a DC-adapted control mode of controlling the driver.

In the example of FIG. 5, method 500 includes detecting whether an input is primarily alternating current (AC) or primarily direct current (DC) (e.g., input type detector 112 of driver controller 110 detecting whether an input to driver 100 is primarily AC or primarily DC, as described above with reference to FIGS. 1-4) (502). Method 500 further includes controlling an output current in an AC-adapted control mode in response to detecting that the input is primarily AC (e.g., two-mode output control 114 responding to receiving an indication from input type detector 112 of a primarily AC input by opting to control the output current in an AC-adapted constant $T_{on}$ control mode with constant $T_{on}$ control 252, as described above with reference to FIGS. 1-4) (504), and controlling the output current in a DC-adapted control mode in response to detecting that the input is primarily DC (e.g., two-mode output control 114 responding to receiving an indication from input type detector 112 of a primarily DC input by opting to control the output current in a DC-adapted peak current control mode with peak current control 254, as described above with reference to FIGS. 1-4) (506).

Any of the circuits, devices, and methods described above may be embodied in or performed in whole or in part by any of various types of integrated circuits, chip sets, and/or other devices, and/or as software executed by a computing device, for example. This may include processes performed by, executed by, or embodied in one or more microcontrollers, central processing units (CPUs), processing cores, field-programmable gate arrays (FPGAs), programmable logic devices (PLDs), virtual devices executed by one or more underlying computing devices, or any other configuration of hardware and/or software.

For example, a driver controller of this disclosure (e.g., driver controller 110 as described above with reference to FIGS. 1-5) may be implemented or embodied as an integrated circuit configured, via any combination of hardware, logic, general purpose processors, application specific integrated circuits (ASICs), field programmable gate arrays (FPGAs), and/or general processing circuits, which may execute software instructions in some examples, to perform various functions described herein. The integrated circuit may be configured to detect the type of input to driver 100 and to control the output of driver 100 in either an AC-adapted control mode or a DC-adapted control mode as described above. Thus, some examples of this disclosure may be directed as follows:

Example 1: a method of controlling a driver, the method comprising: detecting whether an input is primarily alternating current (AC) or primarily direct current (DC); and controlling an output current in an AC-adapted control mode in response to detecting that the input is primarily AC, and controlling the output current in a DC-adapted control mode in response to detecting that the input is primarily DC.

Example 2: the method of example 1, wherein detecting whether the input is primarily AC or primarily DC comprises: measuring a total range of voltage variation between a minimum voltage and a maximum voltage of the input; determining the input to be primarily AC if the total range is greater than a selected threshold; and determining the input to be primarily DC if the total range is less than the selected threshold.

Example 3: the method of any combination of examples 1 and 2, wherein detecting whether the input is primarily AC or primarily DC comprises: determining whether a minimum voltage of the input is less than a selected base threshold; determining the input to be primarily AC if the minimum voltage of the input is less than the selected base threshold; and determining the input to be primarily DC if the minimum voltage of the input is greater than the selected base threshold.

Example 4: the method of any combination of examples 1-3, wherein detecting whether the input is primarily AC or primarily DC comprises: determining whether a minimum voltage of the input is less than a selected base threshold; determining the input to be primarily AC if the minimum voltage of the input is less than the selected base threshold; measuring a total range of voltage variation between the minimum voltage and a maximum voltage of the input, in response to determining that the minimum voltage of the input is not less than the selected base threshold; determining the input to be primarily AC if the total range is greater than a selected range threshold; and determining the input to be primarily DC if the total range is less than the selected range threshold.

Example 5: the method of any combination of examples 1-4, wherein detecting whether the input is primarily AC or primarily DC comprises: measuring a total range of voltage variation between a minimum voltage and a maximum voltage of the input; determining whether a minimum voltage of an input is less than a selected base threshold; determining the input to be primarily AC if a weighted combination of the total range of voltage variation of the input relative to a selected range threshold and the minimum voltage of the input relative to the selected base threshold is greater than a selected weighted combination threshold; and determining the input to be primarily DC if the weighted combination of the total range of voltage variation of the input relative to the selected range threshold and the minimum voltage of the input relative to the selected base threshold is not greater than the selected weighted combination threshold.

Example 6: the method of any combination of examples 1-5, wherein detecting whether the input is primarily AC or primarily DC comprises: distinguishing between period variations and non-periodic variations in a voltage of the input; and evaluating the period variations but not the non-periodic variations in the voltage of the input in detecting whether the input is primarily AC or primarily DC.

Example 7: the method of any combination of examples 1-6, wherein detecting whether the input is primarily AC or primarily DC comprises: making an initial determination that the input is primarily AC or primarily DC; subsequently detecting changed behavior of the input; and making a new determination of whether the input is primarily AC or primarily DC based on the changed behavior of the input.

Example 8: the method of any combination of examples 1-7, further comprising: clamping a voltage of the input such that the input has a clamped voltage, wherein detecting whether the input is primarily AC or primarily DC comprises evaluating the clamped voltage.

Example 9: the method of any combination of examples 1-8, wherein controlling the output current in the AC-adapted control mode comprises transmitting the output current with a constant turn-on time.

Example 10: the method of any combination of examples 1-9, wherein controlling the output current in the AC-adapted control mode further comprises: measuring an AC half-cycle period of the input; and determining a period of the constant turn-on time based at least in part on the AC half-cycle period of the input.

Example 11: the method of any combination of examples 1-10, wherein determining the period of the constant turn-on time based at least in part on the AC half-cycle period of the input further comprises: determining an average current of the input based at least in part on the AC half-cycle period; and determining the period of the constant turn-on time based at least in part on the average current of the input.

Example 12: the method of any combination of examples 1-11, wherein controlling the output current in the DC-adapted control mode comprises controlling the output current in a peak current control mode.

Example 13: a driver controller device comprising: an input type detector; and a conditional two-mode output control.

Example 14: the driver controller device of example 13, wherein the input type detector is configured to detect whether an input is primarily alternating current (AC) or primarily direct current (DC); and wherein the conditional two-mode output control is configured to control an output current in an AC-adapted control mode in response to detecting that the input is primarily AC, and to control the output current in a DC-adapted control mode in response to detecting that the input is primarily DC.

Example 15: the driver controller device of any combination of examples 13 and 14, wherein the input type detector is configured to: measure a total range of voltage variation between a minimum voltage and a maximum voltage of the input; determine the input to be primarily AC if the total range is greater than a selected threshold; and determine the input to be primarily DC if the total range is less than the selected threshold.

Example 16: the driver controller device of any combination of examples 13-15, wherein the conditional two-mode output control is configured to: control the output current in an AC-adapted control mode that comprises transmitting the output current with a constant turn-on time, in response to detecting that the input is primarily AC; and control the output current in a DC-adapted control mode that comprises controlling the output current in a peak current control mode.

Example 17: an integrated circuit for controlling a driver, the integrated circuit comprising: an input type detector; and a conditional two-mode output control.

Example 18: the driver integrated circuit of example 17, wherein the input type detector is configured to detect whether an input is primarily alternating current (AC) or primarily direct current (DC); and wherein the conditional two-mode output control is configured to control an output current in an AC-adapted control mode in response to detecting that the input is primarily AC, and to control the output current in a DC-adapted control mode in response to detecting that the input is primarily DC.

Example 19: the driver integrated circuit of any combination of examples 17 and 18, wherein the input type detector is configured to: measure a total range of voltage variation between a minimum voltage and a maximum voltage of the input; determine the input to be primarily AC if the total range is greater than a selected threshold; and determine the input to be primarily DC if the total range is less than the selected threshold.

Example 20: the driver integrated circuit of any combination of examples 17-19, wherein the conditional two-mode output control is configured to: control the output current in an AC-adapted control mode that comprises transmitting the output current with a constant turn-on time, in response to detecting that the input is primarily AC; and control the output current in a DC-adapted control mode that comprises controlling the output current in a peak current control mode.

Various examples have been described above. These and other examples are within the scope of the following claims.

What is claimed is:

1. A method of controlling a driver, the method comprising:
    detecting whether an input is primarily alternating current (AC) or primarily direct current (DC); and
    controlling an output current in an AC-adapted control mode in response to detecting that the input is primarily AC, and controlling the output current in a DC-adapted control mode in response to detecting that the input is primarily DC;
    wherein, in a programmatic mode, detecting whether the input is primarily AC or primarily DC comprises:
        measuring a total range of voltage variation between a minimum voltage and a maximum voltage of the input;
        determining the input to be primarily AC when the total range is greater than a selected threshold; and
        determining the input to be primarily DC when the total range is less than the selected threshold.

2. The method of claim 1, wherein in another programmatic mode detecting whether the input is primarily AC or primarily DC comprises:
    determining whether a minimum voltage of the input is less than a selected base threshold;
    determining the input to be primarily AC when the minimum voltage of the input is less than the selected base threshold; and
    determining the input to be primarily DC when the minimum voltage of the input is greater than the selected base threshold.

3. The method of claim 1, wherein in another programmatic mode detecting whether the input is primarily AC or primarily DC comprises:
    determining whether a minimum voltage of the input is less than a selected base threshold;
    determining the input to be primarily AC when the minimum voltage of the input is less than the selected base threshold;
    measuring a total range of voltage variation between the minimum voltage and a maximum voltage of the input, in response to determining that the minimum voltage of the input is not less than the selected base threshold;

determining the input to be primarily AC when the total range is greater than a selected range threshold; and determining the input to be primarily DC when the total range is less than the selected range threshold.

4. The method of claim 1, wherein in another programmatic mode detecting whether the input is primarily AC or primarily DC comprises:

measuring a total range of voltage variation between a minimum voltage and a maximum voltage of the input;

determining whether a minimum voltage of an input is less than a selected base threshold; determining the input to be primarily AC when a weighted combination of the total range of voltage variation of the input relative to a selected range threshold and the minimum voltage of the input relative to the selected base threshold is greater than a selected weighted combination threshold; and determining the input to be primarily DC when the weighted combination of the total range of voltage variation of the input relative to the selected range threshold and the minimum voltage of the input relative to the selected base threshold is not greater than the selected weighted combination threshold.

5. The method of claim 1, wherein in another programmatic mode detecting whether the input is primarily AC or primarily DC comprises:

distinguishing between period variations and non-periodic variations in a voltage of the input; and evaluating the period variations but not the non-periodic variations in the voltage of the input in detecting whether the input is primarily AC or primarily DC.

6. The method of claim 1, wherein detecting whether the input is primarily AC or primarily DC comprises:

making an initial determination that the input is primarily AC or primarily DC;

subsequently detecting changed behavior of the input; and making a new determination of whether the input is primarily AC or primarily DC based on the changed behavior of the input.

7. The method of claim 1, further comprising:

clamping a voltage of the input such that the input has a clamped voltage, wherein detecting whether the input is primarily AC or primarily DC comprises evaluating the clamped voltage.

8. The method of claim 1, wherein controlling the output current in the AC-adapted control mode comprises transmitting the output current with a constant turn-on time.

9. The method of claim 8, wherein controlling the output current in the AC-adapted control mode further comprises:

measuring an AC half-cycle period of the input; and determining a period of the constant turn-on time based at least in part on the AC half-cycle period of the input.

10. The method of claim 9, wherein determining the period of the constant turn-on time based at least in part on the AC half-cycle period of the input further comprises:

determining an average current of the input based at least in part on the AC half-cycle period; and determining the period of the constant turn-on time based at least in part on the average current of the input.

11. The method of claim 1, wherein controlling the output current in the DC-adapted control mode comprises controlling the output current in a peak current control mode.

12. A driver controller device comprising:

an input type detector; and a conditional two-mode output control;

wherein in a programmatic mode the input type detector is configured to:

measure a total range of voltage variation between a minimum voltage and a maximum voltage of an input;

determine the input to be primarily alternating current (AC) when the total range is greater than a selected threshold; and determine the input to be primarily direct current (DC) when the total range is less than the selected threshold.

13. The driver controller device of claim 12, wherein the conditional two-mode output control is configured to control an output current in an AC-adapted control mode in response to detecting that the input is primarily AC, and to control the output current in a DC-adapted control mode in response to detecting that the input is primarily DC.

14. The driver controller device of claim 12, wherein the conditional two-mode output control is configured to:

control the output current in an AC-adapted control mode that comprises transmitting the output current with a constant turn-on time, in response to detecting that the input is primarily AC; and control the output current in a DC-adapted control mode that comprises controlling the output current in a peak current control mode.

15. An integrated circuit for controlling a driver, the integrated circuit comprising:

an input type detector; and a conditional two-mode output control;

wherein the input type detector is configured to:

measure a total range of voltage variation between a minimum voltage and a maximum voltage of the input;

determine the input to be primarily alternating current (AC) when the total range is greater than a selected threshold; and determine the input to be primarily direct current (DC) when the total range is less than the selected threshold.

16. The driver integrated circuit of claim 15, wherein the conditional two-mode output control is configured to control an output current in an AC-adapted control mode in response to detecting that the input is primarily AC, and to control the output current in a DC-adapted control mode in response to detecting that the input is primarily DC.

17. The driver integrated circuit of claim 15, wherein the conditional two-mode output control is configured to:

control the output current in an AC-adapted control mode that comprises transmitting the output current with a constant turn-on time, in response to detecting that the input is primarily AC; and control the output current in a DC-adapted control mode that comprises controlling the output current in a peak current control mode.

* * * * *